United States Patent [19]

Porcellio et al.

[11] Patent Number: 4,999,715
[45] Date of Patent: Mar. 12, 1991

[54] DUAL PROCESSOR IMAGE COMPRESSOR/EXPANDER

[75] Inventors: Rocco J. Porcellio; David I. Zimmer, both of Fairport, N.Y.

[73] Assignee: Eastman Kodak Company, Rochester, N.Y.

[21] Appl. No.: 444,462

[22] Filed: Dec. 1, 1989

[51] Int. Cl.⁵ .......................................... H04N 1/415
[52] U.S. Cl. .................... 358/433; 358/426; 358/444; 358/261.4
[58] Field of Search .................. 358/426, 261.1, 261.4, 358/433, 444; 382/56; 341/65, 67, 106

[56] References Cited

U.S. PATENT DOCUMENTS

| | | | |
|---|---|---|---|
| 4,394,774 | 7/1983 | Widergren et al. | 382/56 |
| 4,772,956 | 9/1988 | Roche et al. | 358/433 |
| 4,774,587 | 9/1988 | Schmitt | 358/426 |
| 4,947,342 | 8/1990 | Katsura et al. | 340/735 |

Primary Examiner—Edward L. Coles, Sr.
Assistant Examiner—Dov Popovici
Attorney, Agent, or Firm—David M. Woods

[57] ABSTRACT

An image compression and expansion processor includes a dual port memory configured with image and compressed data processing blocks, a host processor for managing movement of predefined blocks of data between an external frame store memory and the dual port memory, and a digital signal processor for compressing or expanding the data stored in the dual port memory. Because minimum redundancy encoding and decoding is employed to reduce the data stream according to the complexity of the image, data streams of undefined length (relative to the predefined blocks of data) are periodically resident in the compressed processing block. By maintaining bit length definition of the data in the compressed block (relative to the predefined blocks), the host processor is able to move defined lengths of compressed data from the dual port memory while the digital signal processor is concurrently processing the predefined blocks of image data.

6 Claims, 5 Drawing Sheets

DUAL PROCESSOR IMAGE COMPRESSOR/EXPANDER

BACKGROUND OF THE INVENTION

1. Field of the Invention

This invention relates generally to apparatus for information signal processing and, more particularly, to apparatus for compressing and expanding image data information in connection with transmission over a low bandwidth channel.

2. Background Art

Transmission of high resolution image data over a low bandwidth channel, such as a standard telephone line, is time consuming. The relatively low bandwidth of a telephone line, and the large bandwidth of a high quality image, can dictate transmission times for a single analog image frame on the order of 20 minutes. It has been recognized that one way around such unacceptably long transmission times for a single image frame is to digitize and compress the image signal prior to transmission. Various image data compression techniques are known in the art, including thresholding, normalization, quantization and minimum redundancy encoding. In addition, it is well-known that compression techniques are improved, and the number of bits required to represent a frame can be reduced, if the image data is initially transformed in accordance with certain well known transform algorithms, such as the discrete cosine transform algorithm.

U.S. Pat. No. 4,772,956, which is expressly incorporated by reference into the present disclosure, describes a compressor utilizing dual processors and a dual port memory. The compressor accesses successive pairs of a series of predefined square (or rectangular) blocks of image data stored in a frame store memory and stores them in the dual port memory. Image compression is divided between the dual processors, which access the pair of blocks through the different ports of the dual port memory. One of the dual processors is a digital signal processor programmed to perform the discrete cosine transform portion of the compression algorithm, while the other of the dual processors is a microprocessor programmed to perform block-to-serial conversion of the discrete cosine transform coefficients generated by the digital signal processor. The microprocessor is further programmed to perform thresholding, normalization, quantization and minimum redundancy encoding. The resulting compressed image data is loaded into a reserved portion of the frame store memory called the compressed image buffer.

Alternative allocations of the compression algorithm among the dual processors are also disclosed in U.S. Pat. No. 4,772,956. For example, the digital signal processor may be programmed to perform the discrete cosine transform, the block-to-serial conversion, thresholding, normalization and quantization, leaving only the minimum redundancy encoding to be performed by the microprocessor. Consequently, the reduction of the bit stream (by minimum redundancy encoding) from the predefined block size is always done by the microprocessor after the partially processed data is finally withdrawn from the dual port memory. Likewise, minimum redundancy decoding from the reduced bit stream to a standard block size is always done before the data is first written into the dual port memory. This means that well-defined bit streams are always being transferred between the processors through the dual port memory.

With the availability of very fast digital signal processors, it is feasible to allocate all of the image compression, including minimum redundancy encoding and decoding, to the digital signal processor without paying a speed penalty and to use the microprocessor mainly as a host processor for data management. However, the task of data management in the dual port memory becomes more than a simple reallocation of effort because the digital signal processor is generating (i.e., compressing) and decoding (i.e., expanding) a data stream having an undefined length relative to the predefined input (or output) block of image data. Thus, once the digital signal processor performs all compression functions, including minimum redundancy encoding, undefined streams of data flow across the dual port memory and efficient management and use of the memory space becomes more difficult.

SUMMARY OF THE INVENTION

The invention solves the problem of undefined data lengths by including a bit length defining function that regulates access to compressed data in the dual port memory according to the progression of compression or expansion. More particularly, the image compression and expansion processor includes an image buffer capable of storing predefined blocks of image data, a compressed data buffer capable of storing compressed data, a dual port memory configured with image data processing blocks and a compressed data processing block for storing data during processing, a host processor for moving data between either the image buffer or the compressed data buffer through a first memory port of the dual port memory to respective data processing blocks, and a digital signal processor for accessing filled data processing blocks through a second memory port of the dual port memory. Among its tasks, the host processor signals the digital signal processor when a data processing block in the dual port memory is filled. The digital signal processor responds to such an interrupt by initiating a compression or expansion operation.

The problem of transferring undefined bit streams through the dual port memory is handled according to the invention by including means for defining the bit length of compressed data in the compressed data processing block corresponding to the size of a predefined block of image data. In this way, the host processor periodically moves defined lengths of compressed data between the dual port memory and the external compressed data buffer while the digital signal processor is concurrently processing the predefined blocks of image data. More specifically, the undefined data lengths of compressed data bytes are managed by maintaining a count of the compressed bytes involved in the minimum redundancy encoding or decoding. At points in the processing when a fully encoded or decoded image block can be correlated with the number of compressed bytes obtained therefrom, the byte count is relayed to the host processor and access to the compressed data processing block is relinquished by the digital signal processor to the host processor. Structuring the access protocol in such a manner tends to maximize utilization of the digital signal processor, especially during expansion when the minimum redundancy decoding portion is completed and data lengths are defined before the rest of the expansion, i.e., thresholding, normalization, quantization, and inverse transformation, is completed by the digital signal processor.

BRIEF DESCRIPTION OF THE DRAWINGS

The invention will be described in relation to the drawings, in which.

DETAILED DESCRIPTION OF THE INVENTION

Figure 1:
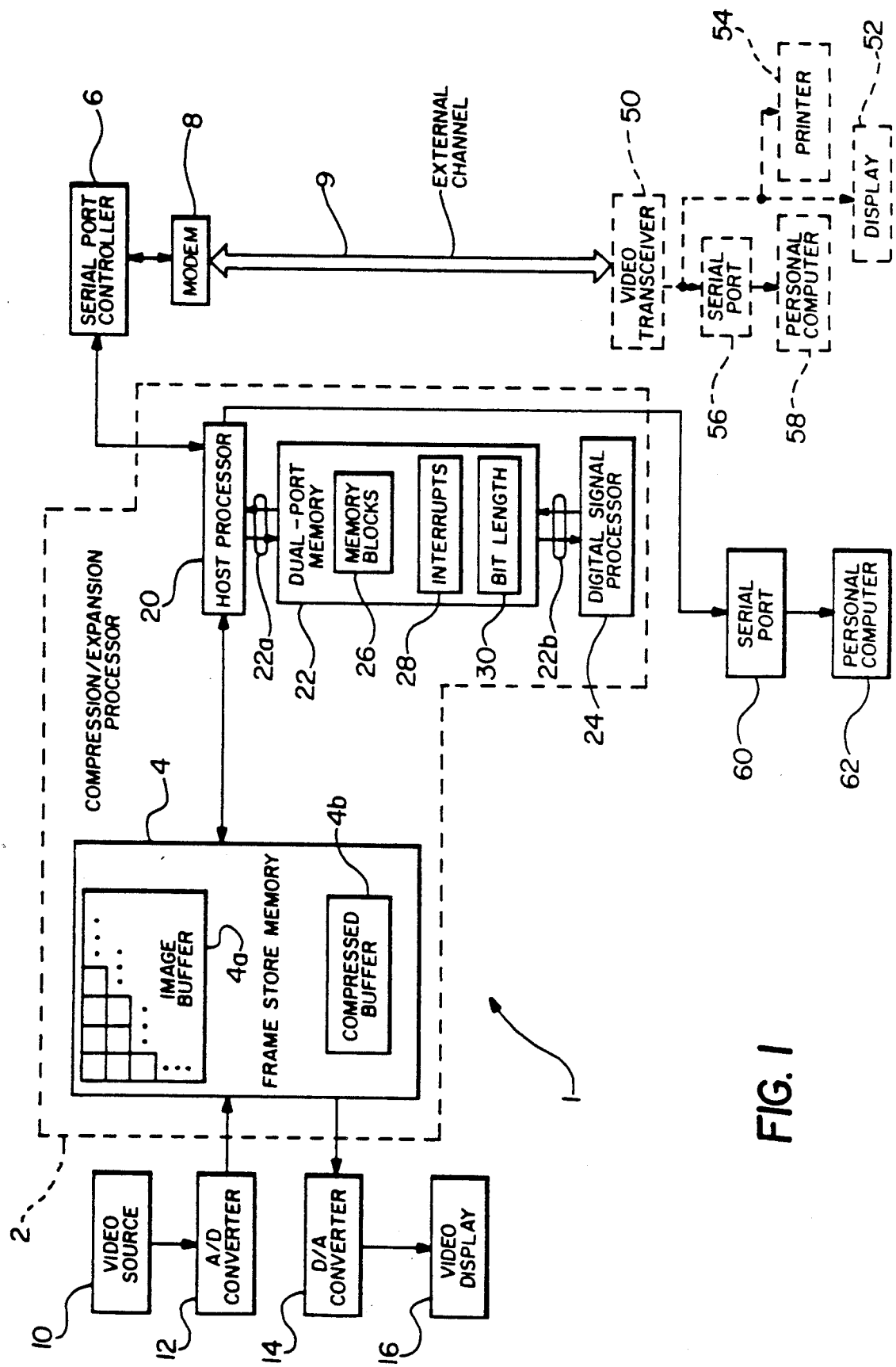
FIG. 1 is a block diagram of an image transceiver employing the invention.

Referring to FIG. 1, an image transceiver 1 operating according to the invention includes a compression processor 2 which compresses image data stored in a frame store memory 4 and furnishes the compressed data to a serial port controller 6 for modulation in a modem 8 and transmission over an external channel 9. The image data stored in the frame store memory 4 was first received from a video source 10 and converted to digital bits by an analog-to-digital converter 12 before being loaded into the frame store memory 4. The image transceiver of FIG. 1 may operate as either a transmitter or receiver. As a receiver, it receives compressed image data in the modem 8 and decompresses the data in the compression processor 2 (which, for this purpose, functions also as an expansion processor). After the compression processor 2 expands the received image data, it stores the data in the frame store memory 4. The expanded data may then be read out through a digital-to-analog converter 14 and the resulting analog signal may be viewed on a video display 16.

Typically, the frame store memory 4 is divided into two portions, an image buffer 4a and a compressed data buffer 4b. (In practice, these two buffer portions may be entirely separate memories). The image buffer stores bytes of uncompressed digital image data, the bytes individually representing the amplitudes of the image pixels of one video frame. If the image buffer 4a contains data representing an NTSC video frame, then it contains about 250,000 bytes. The compressed buffer 4b need have only about ¼ the memory capacity of the image buffer 4a by virtue of the data compression achieved by the compression processor 2.

Figure 2:
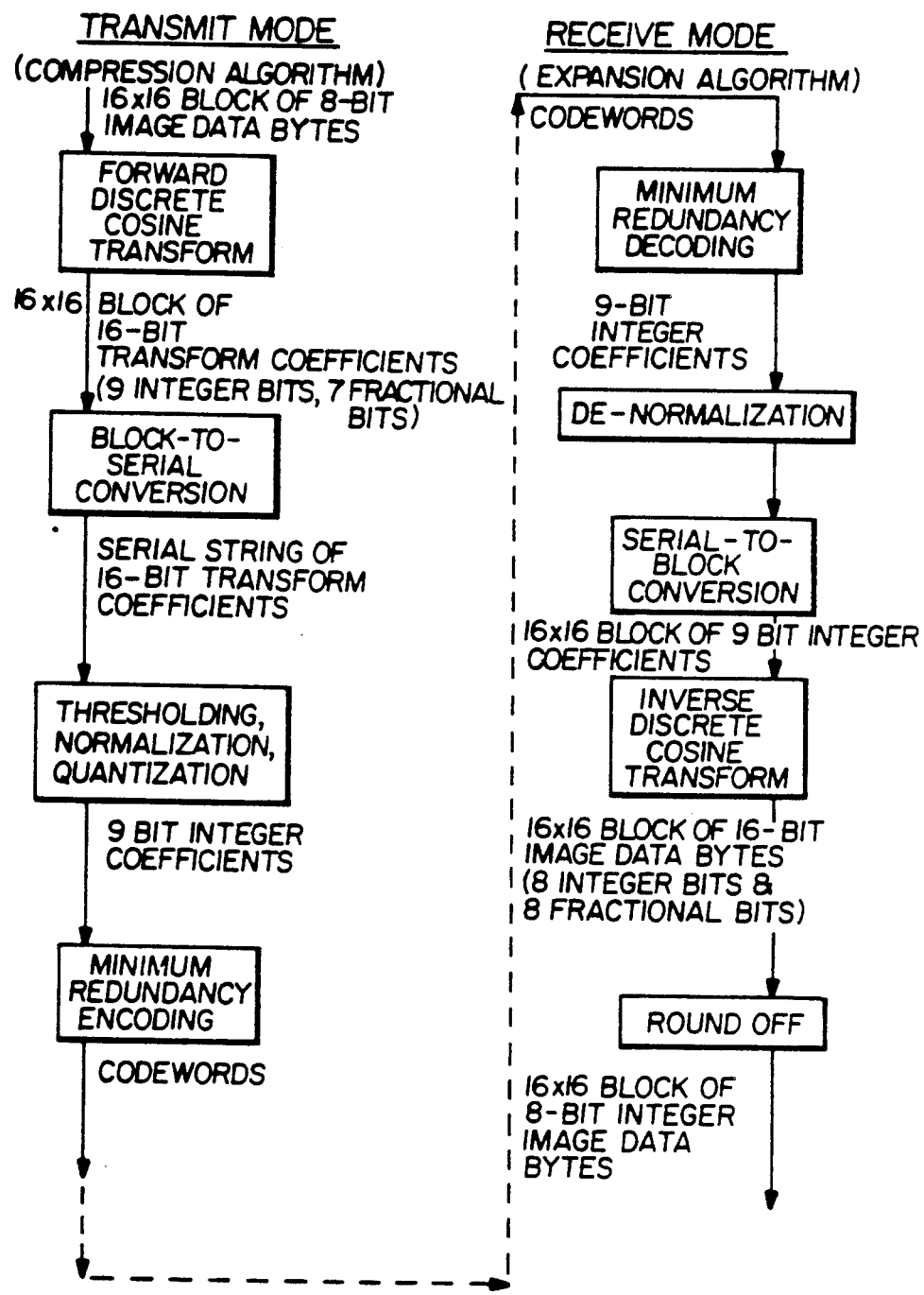
FIG. 2 is a functional flow diagram illustrating the image compression and expansion algorithm employed in the preferred embodiment of the invention.
Figure 3:
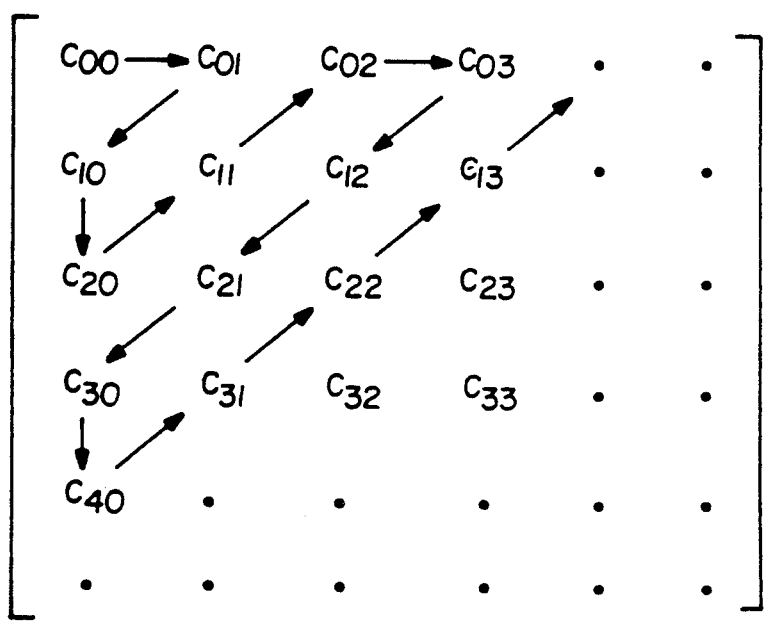
FIG. 3 is a block diagram illustrating a block-to-serial data conversion performed in the algorithm of FIG. 2.

When the image transceiver of FIG. 1 operates in the transmission mode, the compression processor 2 performs a known compression algorithm (illustrated in FIG. 2). When the transceiver of FIG. 1 operates in its receive mode, it executes a known expansion algorithm (also illustrated in FIG. 2). The compression algorithm of FIG. 2 begins with the discrete cosine transforming of each successive block of the image data to generate a corresponding block of cosine transform coefficients. The cosine transform coefficients are then rearranged in serial order by a block-to-serial conversion step best illustrated in FIG. 3. The block-to-serial conversion step consists of arranging the discrete cosine transform coefficients in order of increasing spatial frequency, which corresponds to the zig-zag pattern of FIG. 3. The resulting serial string of transform coefficients is then subject to thresholding, normalization, quantization and minimum redundancy encoding. Thresholding discards data words of magnitudes less than a threshold number. Normalization entails dividing each data word by a divisor to yield a quotient. Quantization discards the fractional bits in the quotient.

Minimum redundancy encoding is a technique well-known in the prior art and employs two complimentary steps, namely, amplitude encoding and run length encoding. Amplitude encoding(or "Huffman Encoding") assigns to each of a finite set of possible amplitudes an encoded bit pattern designed to require the smallest number of bits of non-redundant representation. Run length encoding represents any consecutive run of zeros in the data as the smallest non-redundant bit pattern required to count the number of zeros in the run. The set of bit patterns representing each of the possible word amplitudes and the set of bit patterns representing each of the possible zero run lengths may be selected in accordance with well-known principles and stored in look-up tables for use during the compression process, and need not be described further herein. For understanding the present invention, it is helpful to recall that minimum redundancy encoding reduces a predefined block of image data into an undefined stream of data, that is, "undefined" in the sense of there being no a priori knowledge of the image characteristics that determine the extent of compression and, thus, the number of resulting bits.

Figure 4:
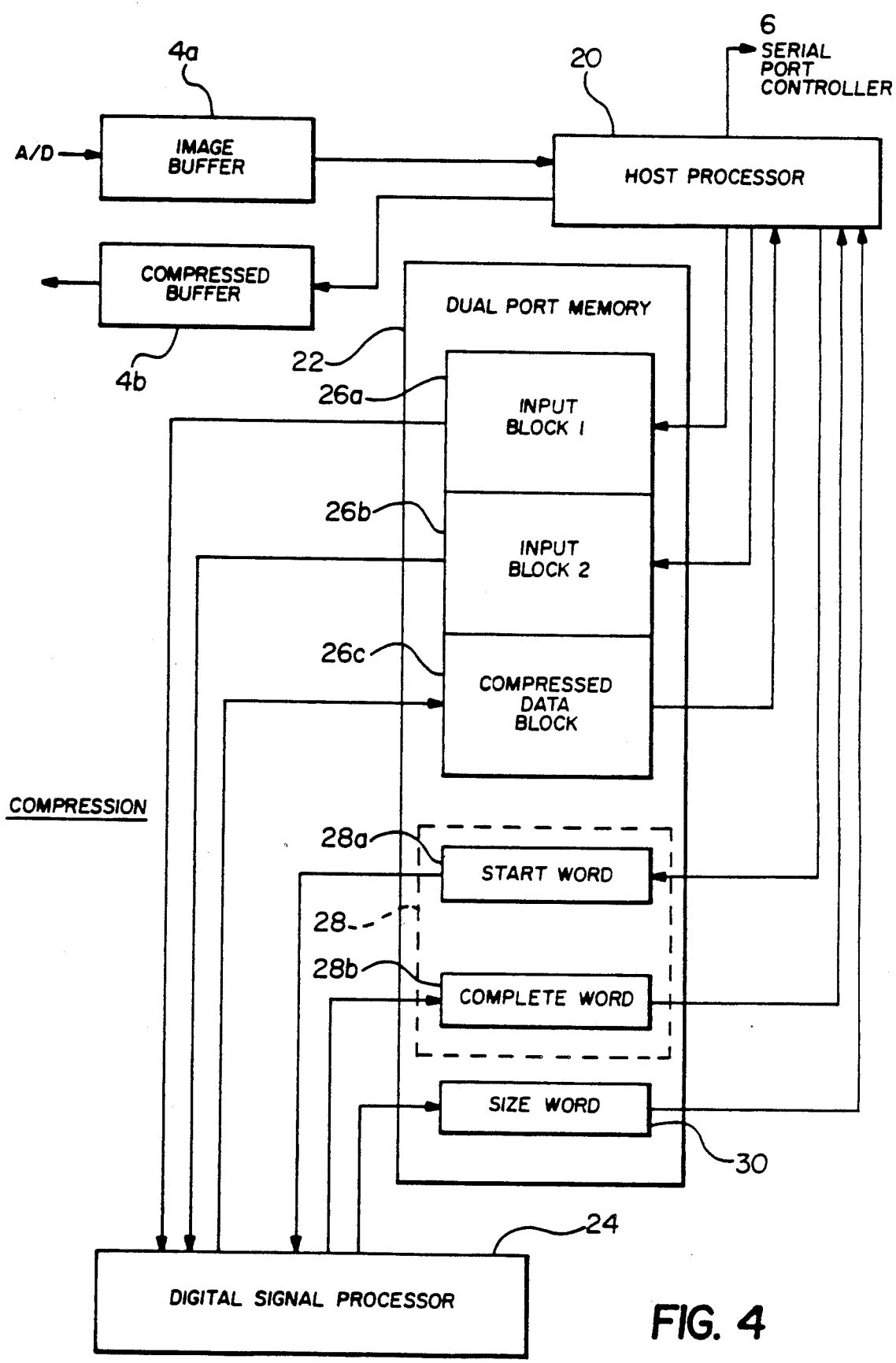
FIG. 4 is a data flow diagram helpful in explaining the dual processor compression protocol.
Figure 5:
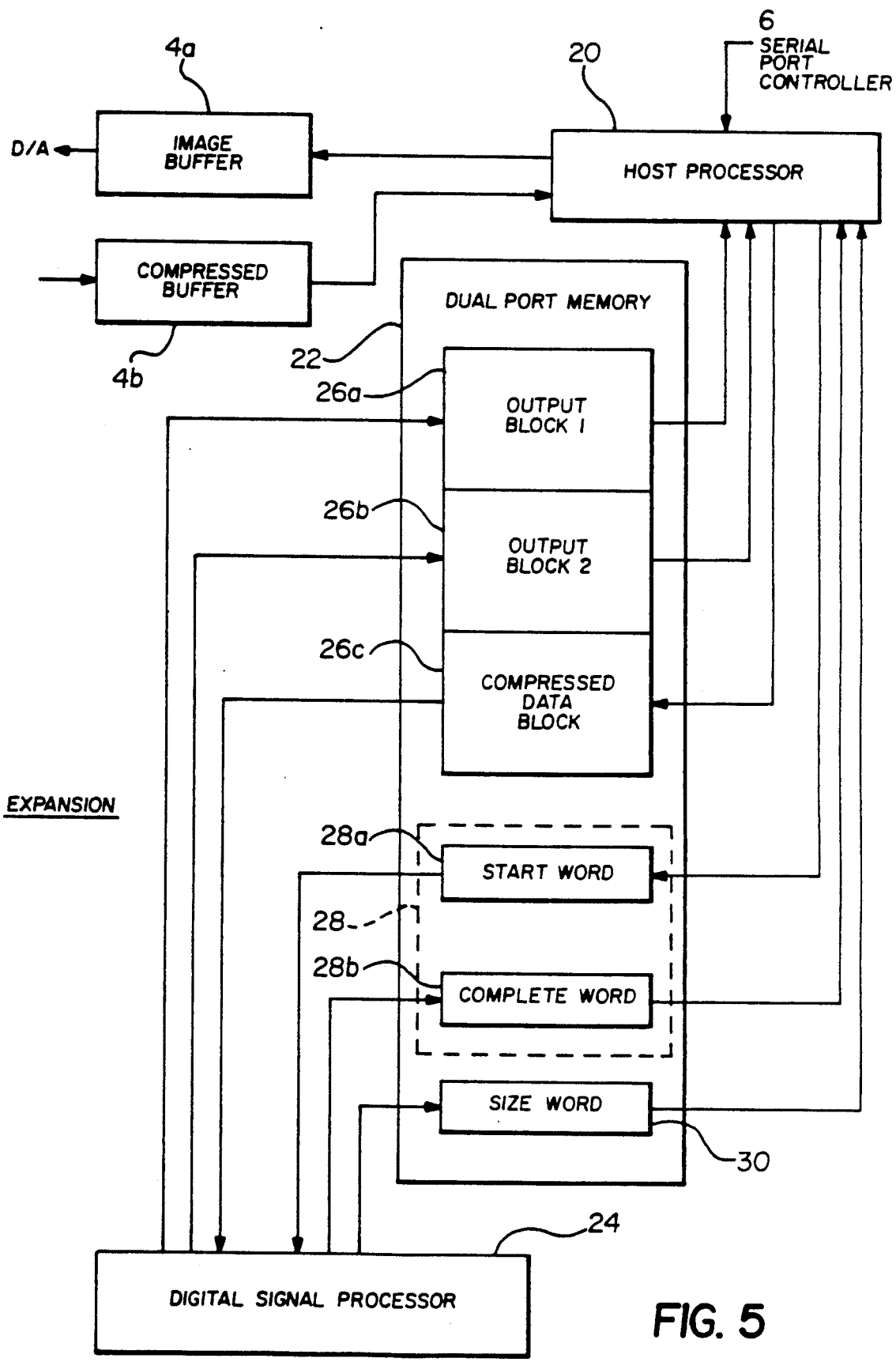
FIG. 5 is a data flow diagram helpful in explaining the dual processor expansion protocol.

Referring again to FIG. 1, the compression processor 2 divides the uncompressed video data held in the frame store memory 4 into a plurality of blocks (as indicated in FIG. 1) and fetches successive blocks during each process cycle. To this end, the compression processor 2 includes a host processor 20, which performs the data fetching and storing tasks, a dual port memory 22 and a digital signal processor 24. The host processor 20 accesses the dual port memory 22 through a first port 22a while the digital signal processor accesses the dual port memory 22 through a second port 22b. In an exemplary embodiment of the invention, the dual port memory 22 is configured with a plurality of memory processing blocks 26 accessible from either of the dual ports 22a and 22b for transferring data between the host processor 20 and the digital signal processor 24. Referring to FIGS. 4 and 5, the memory blocks 26 include an input (or output) processing block 26a, an input (or output) processing block 26b and a compressed data processing block 26c. As further shown in FIG. 1, the dual port memory 22 includes storage for an interrupt operator 28 (also shown as a start word 28a and a complete word 28b in FIGS. 4 and 5) and storage for a bit length operator 30.

The compressed data is transmitted over the external channel, e.g., a telephone line, to an image transceiver 50, which may be generally of the same configuration as illustrated heretofore in FIG. 1. As the distant end of the channel, the transceiver 50 may provide input to a typical variety of peripherals, e.g., a video display 52 or a hard-copy printer 54, or, via a serial port controller 56, to a personal computer 58. Furthermore, an extra serial port controller 60 may be connected to the host processor 20. This feature provides for image storage at an external personal computer 62 as well as various image transmission options, e.g., compressed or uncompressed images can be downloaded through the serial port 60 for storage or manipulation within the external computer 62, compressed or uncompressed images can be uploaded from the external computer 62 through the serial port 60, the two external computers 58 and 62 can communicate via transceivers 1 and 50 over the external channel, and so on.

The data management protocol for implementing the transmission mode compression algorithm of FIG. 2 is shown diagrammatically in FIG. 4. When compression is initiated, a predefined block of digital image data is moved from the image buffer 4a to the input block 26a of the dual port memory 22. The host processor 20 then signals the digital signal processor 24 to begin the compression algorithm on the stored data by setting an appropriate bit value in the start word 28a. Writing at this location generates an interrupt which starts the digital signal processor 24. While the digital signal processor 24 is working on the input block 26a, the host processor 20 moves another predefined block of digital image data from the image buffer 4a into the input block 26b and sets a further bit value to the start word 28a to let the digital signal processor 24 know that further image data is available in the input block 26b. The digital signal processor 24 queues the start request in the start word 28a.

When the digital signal processor 24 completes compression of the image data in the input block 26a, it places the compressed data in the compressed data block 26c and sets a bit value in the complete word 28b. The complete word interrupts the host processor 20 and the bit value therein identifies which input block (26a or 26b) is then available to fill with more input image data. Since the compression operation provides data reduction dependent upon the content of the image, the amount of compressed data in the compressed data block 26c is undefined as seen by the host processor 20. During compression, the digital signal processor 24 monitors the number of input bytes used and, when the input block is fully compressed, outputs the number of compressed bytes corresponding to the input block to the bit length operator 30, which is shown in FIGS. 4 and 5 as a size word 30. The digital signal processor 24 then relinquishes control of the compressed data block 26c to the host processor 20. The host processor 20 accesses the value in the size word 30 in order to determine the amount of compressed data (i.e., number of bytes) in the compressed data block 26c. When the host processor 20 has completed moving the compressed data from the compressed data block 26c to the compressed buffer 4b, the host processor 20 sets a further bit value in the start word 28a to inform the digital signal processor 24 that the host processor 20 has completed the transfer of compressed data from the compressed data block 26c and is relinquishing control thereof. The digital signal processor is therefore free to place more compressed data in the compressed data block 26c.

The data management protocol for implementing the expansion algorithm is shown diagrammatically in FIG. 5. When expansion is initiated the host processor 20 moves bytes of compressed digital data from the compressed buffer 4b to the compressed data block 26c. When the block 26c is filled, the host processor 20 sets an appropriate bit value in the start word 28a and relinquishes control of the compressed data block 26c, thereby generating an interrupt signal which causes the digital signal processor 24 to retrieve the compressed data in the compressed data block 26c and to begin the expansion algorithm (as outlined in FIG. 2). The start word 28a also assigns the expanded data to a particular output block, e.g., output block 26a, and, as the minimum redundancy decoding progresses, the processor 24 moves the decoded data to the output block 26a.

Once redundancy decoding is completed upon a (undefined) portion of the compressed bytes in the compressed data block 26c and the output block 26a is filled with decoded bytes, the processor 24 is ready to relinquish control of the compressed data block 26c. The further steps of expansion, e.g., de-normalization, serial-to-block conversion, and inverse discrete cosine transform, are completed by the processor 24 upon the decoded bytes in the appropriate output block 26a or 26b. During the course of expansion (according to the functional steps shown in FIG. 2), therefore, the digital signal processor 24 assigns one of three values to the complete word 28b, which signify the following three conditions:

(1) more compressed data requested (redundancy decoding completed for one block);
(2) Output block 26a ready (expansion completed);
(3) Output block 26b ready (expansion completed).

When the digital signal processor 24 completes redundancy decoding of sufficient compressed data in the compressed data block 26c to form one image block, the processor 24 writes the value (1) into the complete word 28b. The host processor 20 recognizes from the value (1) that the compressed data block 26c is ready for more compressed data. Since the decoded data in the output block 26a or 26b is derived from an undefined number of the compressed bytes in the compressed data block 26c (as seen by the host processor 20), the processor 24 writes the number of compressed bytes that were used in the block decoding into the size word 30.

Upon receiving the values in the complete word 28b and the size word 30, the host processor 20 moves additional compressed bytes from the compressed buffer 4b to the compressed data block 26c. When sufficient compressed bytes are moved to again fill the compressed data block 26c, the host processor 20 signals the digital signal processor 24 that the output block 26b is ready for more decoded data by writing an appropriate value into the start word 28a. In practice, the host processor 20 includes a compressed data usage register (not shown) having a pointer that is advanced according to the number of compressed bytes used in decoding a full block of image data. If the compressed data block 26c contains, e.g., 256 bytes, when the processor 24 calls for more compressed bytes (by writing the proper values in the complete word 28b and the size word 30), the host processor 20 writes a new sequence of 256 bytes into the compressed data block 26c beginning with the byte at the pointer location. This shifts unused bytes in the compressed data block 26c toward the beginning of the stored sequence and adds new bytes at the end of the sequence (the number of entirely new bytes equalling the value in the size word 30).

Meanwhile, the digital signal processor 24 is further processing the decoded data in output block 26a according to the expansion algorithm of FIG. 2. When the expansion is completed, the processor 24 interrupts the host processor 20 by writing value (2) into the complete word 28b and the host processor 20 accordingly begins moving the expanded data from the output block 26a to the image buffer 4a. Simultaneously, the digital signal processor 24 accesses the compressed data block 26c and begins redundancy decoding of the compressed bytes, writing the decoded bytes into the output block 26b. As was the case with the preceding output block, when the digital signal processor 24 finishes redundancy decoding, value (1) is written into the complete word 28b and the processor 24 continues expansion of the decoded data in the output block 26b. The host processor 20 again refills the compressed data block 26c with compressed bytes according to the value written the size word 30 and signals the digital signal processor 24 that output block 26a is ready for more decoded data by writing an appropriate value into the start word 28a. When the digital signal processor 24 finishes expansion of the data in the output block 26b, value (3) is written into the complete word 28b and the host processor 20 begins to move expanded data to the image buffer 4a as the digital signal processor 24 again takes control of the compressed data block 26c, and so on.

In the preferred embodiment of the invention, the host processor is an Intel 80186 microprocessor integrated circuit and the digital signal processor 24 is a Texas Instruments 320C25 digital signal processor integrated circuit. The dual port memory 22 is composed of two integrated circuits in a master-slave relationship: an Integrated Device Technologies 7130 memory circuit for low bytes and an Integrated Device Technologies 7140 memory circuit for high bytes.

The invention has been described in detail with particular reference to a presently preferred embodiment, but it will be understood that variations and modifications can be effected within the spirit and scope of the invention.

What is claimed is:

1. An image compression and expansion processor, comprising
   an image buffer capable of storing image data arranged in predefined blocks;
   a compressed data buffer capable of storing compressed data;
   a dual port memory organized into a plurality of image data processing blocks for storing image data and a compressed data processing block for storing compressed data, said dual port memory having first and second memory ports for transferring data to and from the memory;
   a host processor for controlling the movement of image data and compressed data between either said image buffer or said compressed data buffer through said first memory port to respective data processing blocks;
   interrupt means for signalling the filling of a particular data processing block;
   digital signal processor means responsive to said interrupt means for accessing the the filled data processing block through said second port and for initiating a compression or expansion operation upon the accessed data; and
   bit length defining means for defining the bit length of compressed data in the compressed data processing block corresponding to a predefined block of image data, whereby said host processor periodically moves defined lengths of compressed data between the dual port memory and the compressed data buffer while said digital signal processor is concurrently expanding to or compressing from said predefined blocks of image data.

2. An image compression and expansion processor as claimed in claim 1 in which said digital signal processor means performs minimum redundancy data reduction and said bit length defining means includes means cooperative with said digital signal processor means for maintaining a count of the compressed bytes involved in the encoding or decoding thereof.

3. An image compression and expansion processor as claimed in claim 2 in which said bit length defining means provides said compressed byte count to said host processor.

4. An image processor as claimed in claim 1 in which said bit length defining means occupies memory space in said dual port memory.

5. An image compression and expansion processor for expanding a compressed image, comprising:
   an image buffer capable of storing image data arranged in predefined blocks.,
   a compressed data buffer capable of storing compressed data;
   a dual port memory organized into a plurality of image data processing blocks for storing image data and a compressed data processing block for storing compressed data, said dual port memory having first and second memory ports for transferring data to and from the memory;
   a host processor for controlling the movement of compressed data from said compressed data buffer to said compressed data processing block and the movement of said image data from said image data processing block to said image buffer;
   interrupt means for signalling the filling of said compressed data processing block;
   digital signal processor means responsive to said interrupt means for accessing the filled compressed data processing block through said second port and for initiating an expansion operation upon said compressed data, said digital signal processor means performing a minimum redundancy data expansion on a sequence of compressed data bytes and loading a sequence of decoded bytes into an image data processing block;
   bit length defining means for providing a count of the compressed bytes involved in decoding into the predefined block of image data, said bit length defining means having said compressed byte count stored in a section of said dual port memory and accessible through said first and second ports thereof; and
   completion means for signalling the usage of sufficient compressed data bytes to form a predefined block of image data in the image data processing block, whereby said digital signal processor means relinquishes control of said compressed data processing block and begins the remaining expansion processing of the decoded bytes in said image data processing block while, in response to said completion means and said bit length defining means, said host processor moves further compressed data from the compressed data buffer to the compressed data processing block.

6. An image expansion processor as claimed in claim 5 wherein said completion means has an additional state for signalling that expansion of the decoded data in said image data processing block is completed, and wherein said host processor responds to said additional state to move expanded data from said image data processing block to said image buffer.

* * * * *